(12) United States Patent
Chen et al.

(10) Patent No.: US 7,439,340 B2
(45) Date of Patent: Oct. 21, 2008

(54) REACTIVE DYES CONTAINING AN ALKYLTHIO-S-TRIAZINYL REACTIVE GROUP

(75) Inventors: Wen-Jang Chen, Taoyuan Hsien (TW); Hsien-Chung Shia, Taoyuan Hsien (TW); Duncan Adrian Sidney Phillips, Manchester (GB); John Anthony Taylor, Manchester (GB)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/706,363

(22) Filed: Feb. 15, 2007

(65) Prior Publication Data

US 2008/0039614 A1    Feb. 14, 2008

(30) Foreign Application Priority Data

Aug. 9, 2006    (CN) .................... 2006 1 0112104

(51) Int. Cl.
 *C09B 62/51* (2006.01)
 *C09B 62/503* (2006.01)
(52) U.S. Cl. ............. 534/638; 534/617; 534/618; 534/622; 534/625; 534/634; 534/636; 534/637; 540/126; 544/75; 544/76
(58) Field of Classification Search .......... 534/617, 534/618, 622, 625, 634, 636, 637, 638; 540/126; 544/75, 76
See application file for complete search history.

(56) References Cited

U.S. PATENT DOCUMENTS 3,133,059 A * 5/1964 Clark et al. ............ 540/126
3,163,635 A * 12/1964 Riat et al. ............. 534/776
3,883,523 A * 5/1975 Parton ................ 544/76
4,377,688 A * 3/1983 Harms et al. ........... 544/189
4,400,504 A * 8/1983 Harms et al. ........... 544/76
6,068,687 A * 5/2000 Baettig et al. .......... 106/31.48
6,399,751 B1 * 6/2002 Ebenezer et al. ........ 534/617
6,518,407 B1 * 2/2003 Brock et al. ........... 534/604

FOREIGN PATENT DOCUMENTS

EP    264878    * 4/1988
EP    432095    * 6/1991
JP    4-211458    * 8/1992

OTHER PUBLICATIONS

Czajkowski et al., Chemical Abstracts, 142:178645, 2004.*
Lehr, Dyes and Pigments. 14(4), 239-263, 1990.*

* cited by examiner

*Primary Examiner*—Fiona T Powers
(74) *Attorney, Agent, or Firm*—Bacon & Thomas PLLC

(57) ABSTRACT

A reactive dyestuff containing an alkylthio-s-triazinyl reactive group of the following formula (I) is disclosed,

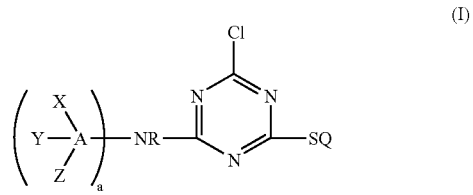

wherein A, X, Y, Z, R, Q, and a are defined the same as the specification. It is suitable for exhaust dyeing, cold batch-up dyeing and continuous dyeing materials that contain hydroxyl group or nitrogen group fibers.

3 Claims, No Drawings

REACTIVE DYES CONTAINING AN ALKYLTHIO-S-TRIAZINYL REACTIVE GROUP

BACKGROUND OF THE INVENTION

1. Field of the Invention

The present invention relates to a novel reactive dyestuff, and more particularly relates to a reactive dyestuff with alkylthio-s-triazine.

2. Description of the Related Art

During the period between the 1960's and early 1980's, the art of a reactive dyestuff with mono alkylthio-s-triazinyl reactive group was developed. The development was mainly focused on the art of a reactive dyestuff used thio/sulphur chemistry, which contains s-triazine or pyramine, as disclosed in British Patent No. GB 923068.

During 1986-1996, the research of a reactive dyestuff was continuously developed but limited to a certain scope of chromophore groups, as disclosed in European Patent No. EP 0264878 and Japanese Patent No. JP 10-001618. A reactive dyestuff taking monochloro triazine and vinylsulfone as the bifunctional reactive group is the mainstream in the present market of 60° C. warm dyeing. However, the activity of the two reactive groups is so different that it mainly uses vinylsulfonyl reactive group to fix the dyes on the cellulose fibers in the application of dyeing. On the contrary, the use of monochloro triazinyl reactive group is relatively low, since the monochloro triazine is a reactive group for 80° C. application. While replacing the monochloro triazine with monofluoro triazine, the activity thereof may be nearly equal to that of the vinylsulfonyl reactive group and the tinctorial yield of the dyestuff may be improved. However, the cost of trifluoro triazine is too high so that the economic benefits of the dyestuffs become low. The present invention provides an alkylthio group as a substituent for monochloro triazine, which makes the activity of the reactive group equal to that of the vinylsulfonyl reactive group and improves efficiently the utilization of the reactive group. Thereby, the dyestuff of the present invention presents properties of high fixation and excellent build up, and has greater economic benefits than that of the dyestuff containing monofluoro triazine. The novel reactive dyestuff of the present invention has improved properties, such as better reactivity, fixing capacity, build up, stable binding between fibers and dyestuffs, excellent wash fastness, light fastness and wet fastness.

In other words, the present invention provides a novel dyestuff with bifunctional reactive groups, comprising an alkylthio group substituent to improve the activity of monochloro triazine, which has higher reactive selectivity and economic benefits.

SUMMARY OF THE INVENTION

The present invention provides a reactive dyestuff containing an alkylthio-s-triazinyl reactive group of the following formula (I),

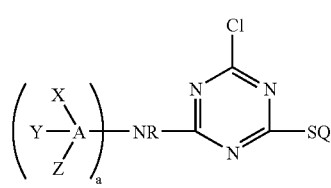
(I)

wherein

X, Y and Z are each independently selected from the group consisting of hydrogen, chlorine, hydroxyl, amino, substituted amino, sulfonate, arylazo,

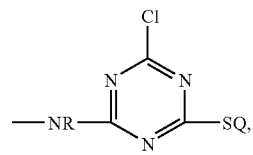

alkyl, alkoxy, α,β-halopropionyl, α-haloacryloyl, —B—SO$_2$CH$_2$CH$_2$W, —B—SO$_2$CH=CH$_2$,— SO$_2$CH$_2$CH$_2$W and —SO$_2$CH=CH$_2$;

B is —CONH—(CH$_2$)$_i$— or —O—(CH$_2$)$_j$—CONH— (CH$_2$)$_k$—, wherein i, j and k are integers independent of one another between 2 to 4;

W is selected from the group consisting of Cl, —OSO$_3$H,

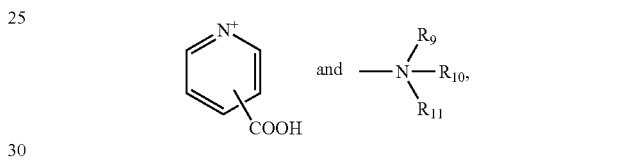

wherein R$_9$, R$_{10}$ and R$_{11}$ are each independently C$_{1-4}$ alkyl

Q is C$_{1-4}$ alkyl or substituted C$_{1-4}$ alkyl;

A is one or more chromophore groups substituted by one or more sulfo;

a is 1 or 2;

R is hydrogen, C$_{1-4}$ alkyl, or C$_{1-4}$ alkyl substituted by hydroxyl, C$_{1-4}$ alkoxy or carboxyl.

The reactive dyestuff of formula (I) of the present invention contains one or more chromophore groups, which can connect with one or more sulfo and at least two fiber-reactive groups, wherein one of the fiber-reactive groups must be

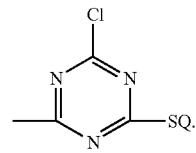

In the reactive dyestuff of formula (I) of the present invention, Q is preferable a methyl or ethyl group, which is unsubstituted or substituted by one to three substitutent groups. The substitutent groups of the methyl or ethyl group are independently selected from the group consisting of halogen, hydroxyl, sulfo, cyano, amino, carbonamido, carboxyl, alkoxycarbonyl, acyloxy and alkoxy.

In the reactive dyestuff of formula (I) of the present invention, the chromophore group A is preferably selected from the group consisting of formazan, anthraquinone, phthalocyanine, triphendioxazine, monoazo, disazo, polyazo and metal complex azo.

Preferably, the structure of phthalocyanine chromophore group is as the following formula:

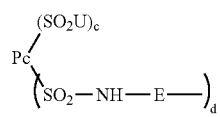

wherein Pc is copper phthalocyanine or nickel phthalocyanine; U is —OH and/or —NH$_2$; E is phenylene or ethylene; and c+d≦4.

The triphendioxazine chromophore group is preferably selected from the group consisting of:

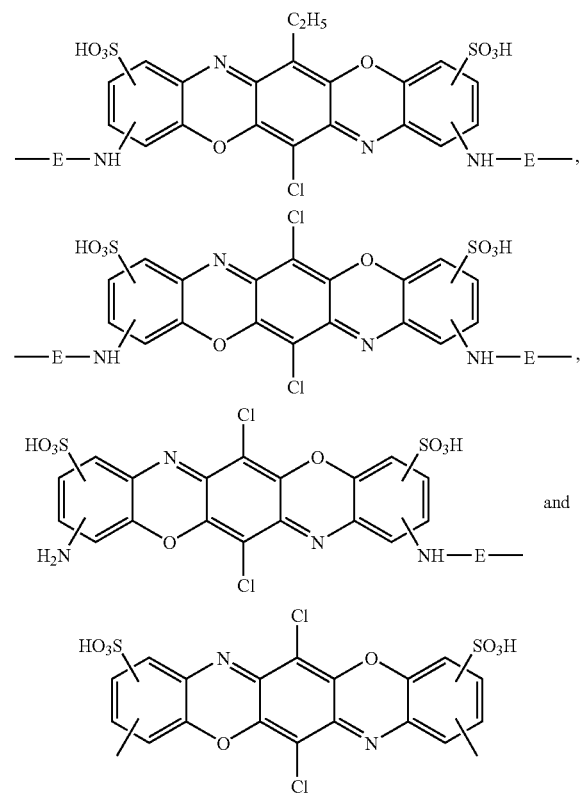

wherein E is phenylene or ethylene.

The monoazo chromophore group is preferably selected from the group consisting of:

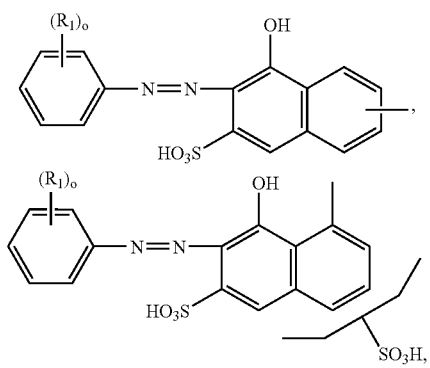

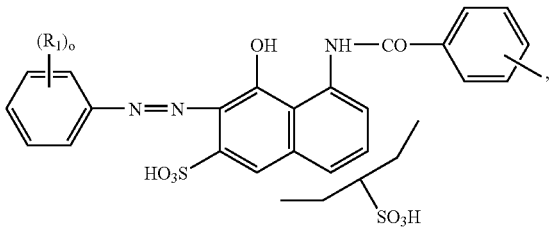

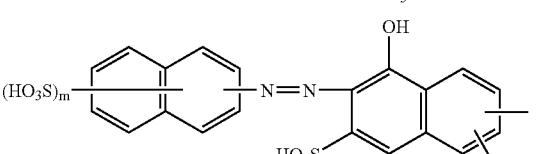

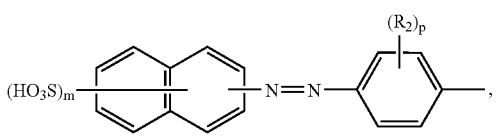

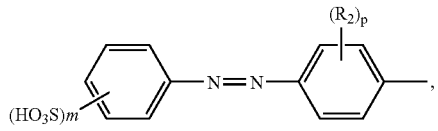

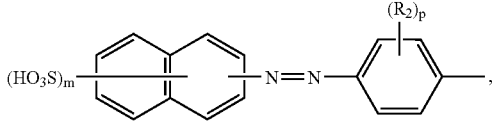

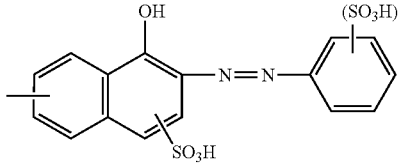

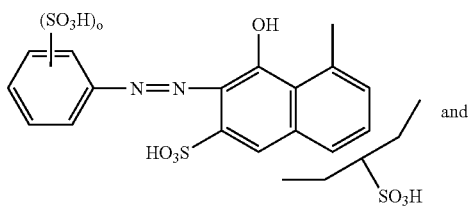

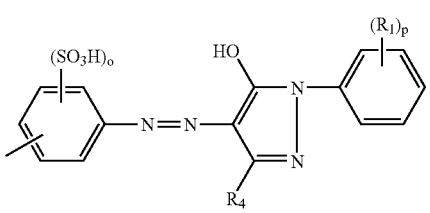

wherein

R$_1$ is halogen, C$_{1-4}$ alkyl, C$_{1-4}$ alkoxyl, carboxyl, sulfo, —SO$_2$CH$_2$CH$_2$W or —SO$_2$CH=CH$_2$, and W is defined the same as the aforementioned;

R$_2$ is C$_{1-4}$ alkyl, C$_{1-4}$ alkoxyl, amino, acetylamino, ureido or sulfo;

R$_4$ is C$_{1-4}$ alkyl or carboxyl; and m, o and p are each independently 0, 1, 2 or 3.

The disazo and polyazo chromophore groups are preferably selected from the group consisting of:

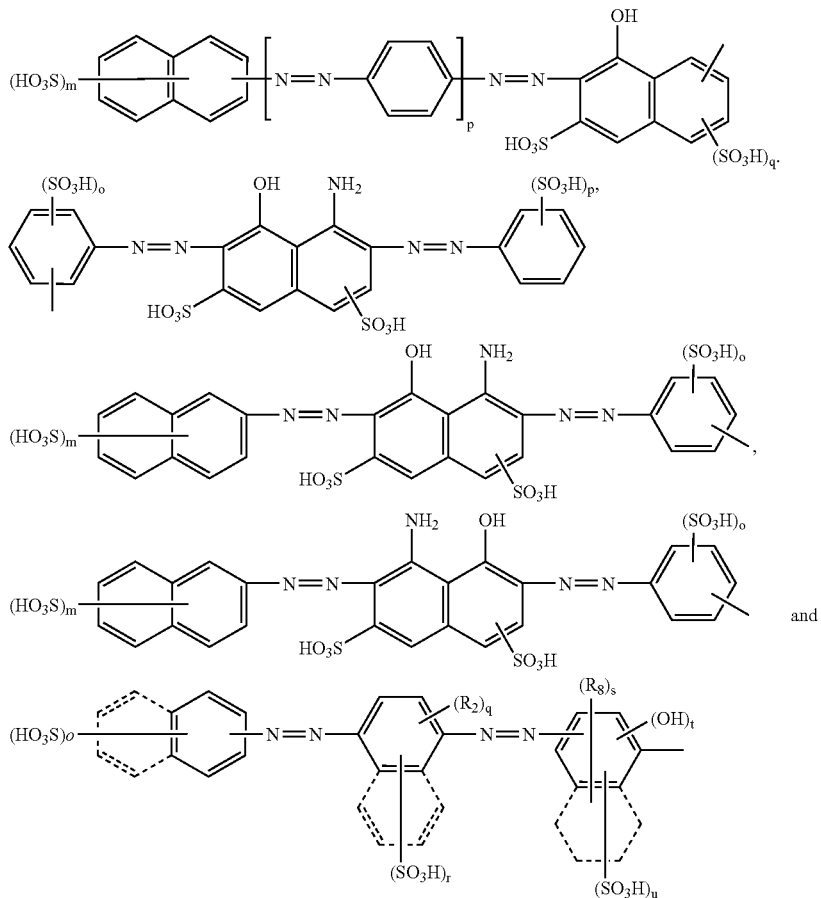

wherein
$R_8$ is $C_{1-4}$ alkyl, $C_{1-4}$ alkoxyl, carboxyl, sulfo, acetyl, acetyl amino, ureido, $-SO_2CH_2CH_2W$ or $-SO_2CH=CH_2$ and W is defined the same as the aforementioned;
q, r, s, t and u are each independently 0, 1, 2 or 3;
$R_2$, m, o and p are defined the same as the aforementioned.

The metal complex azo chromophore group is preferably selected from the group consisting of:

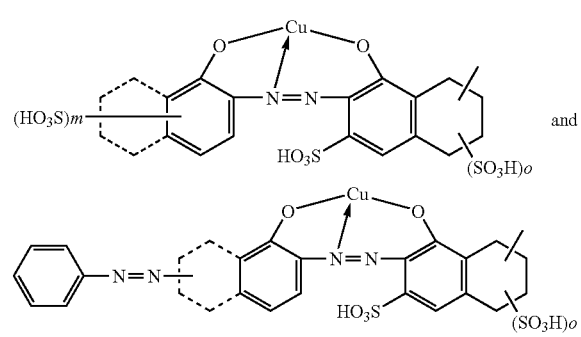

wherein
m and o are defined the same as the aforementioned.

For describing conveniently, the compound is expressed as free acid in the specification. When produced or used, the reactive dyestuffs of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

The dyestuff of the present invention can be applied to dye and print on many kinds of fiber materials, particularly cellulose fiber materials and cellulose-included fiber materials. The examples of the fiber materials are not limited. It can be natural or regenerated cellulose fibers, such as cotton, hemp, linen, jute, amine, mucilage rayon, as well as cellulose-included fiber materials. The dyestuff of the present invention can also be applied to dye and print fiber blended fabrics containing hydroxyl groups.

The dyestuff of the present invention can be applied to the fiber material and fixed on the fiber in various ways, in particularly in the form of aqueous dyestuff solutions and printing pastes. They can be applied to cellulose fibers by general dyeing methods, such as exhaustion dyeing, continuous dyeing, cold-pad-batch dyeing, printing or digital printing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as leveling agent, suspending agent and so on) can be added according to conventional method. The range of dyeing temperature is from 40° C. to 90° C. Preferably, the temperature for dyeing is from 40° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the one-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming. In the two-bath pad dyeing method, the material is padded with a dye liquid and then dealt by a known inorganic neutral salt (e.g., sodium sulfate or sodium silicate). The dealt material is preferably dried and color fixed by baking or steaming as usual.

In the textile printing method, such as single printing method, the material is printed by printing slurry containing the known acid-binding agent (e.g., sodium bicarbonate) and is dried and color fixed by baking or steaming. In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color. The dyeing or printing methods employed in the process of the present invention are not limited to the above methods.

The dyestuff of the present invention is a valuable reactive dyestuff for cellulose fibers in the present dyeing industry. The dyestuff has properties of excellent fixing capacity, outstanding build up and high wash-off and is suitable for dyeing in a wide range of temperatures, which make the dyestuff suitable for dyeing cotton/polyester blended fabrics as well. The dyestuff of the present invention is also suitable for printing, particularly when applying in printing cotton or blended fabrics that contain wool or silk. In the dyeing or printing of cellulose fiber materials, dyed products with various fine dyeing properties are obtained; particularly dyeing, printing or batch-up dyeing products with high quality can be obtained in respect of build up and wash fastness.

DETAILED DESCRIPTION OF THE PREFERRED EMBODIMENT

The dyestuff of the present invention may be prepared by conventional methods, of which diazotization, coupling and condensation reaction are usually used in the field and can be accomplished by one skilled in the art.

Hereinafter, the present invention will be further explained. However, it is to be understood that the examples below are only for illustrated, but not to limit the scope of the present invention. The compounds are represented in the form of free acid. However, in practice, they often exist as metallic salts, and most likely alkaline metallic salts, particularly sodium salts. Unless otherwise stated, the parts and percentage used in the following examples are based on weight, and the temperature is in Celsius degree (° C.).

EXAMPLE 1

(a) 19.45 parts of cyanuric chloride is dispersed in 150 parts of 0° C. water, and then 31.9 parts of 2-amino-5-hydroxy-naphthalene-1,7-disulfonic acid powder is added therein. The pH value of the reaction solution is adjusted to 3 by 15% of $Na_2CO_3$ aqueous solution. The temperature of the aqueous solution is raised smoothly to 20° C. and then maintained for 1~2 hours.

(b) 9.7 parts of thioglycolic acid is added to the solution obtained from the above (a) step. At 20° C., the pH value of the reaction solution is adjusted to 7~7.5 by 18 parts of $Na_2CO_3$ powder and maintained for 15 minutes, followed by adjusting the pH value of the reaction solution to 6~6.5 by HCl aqueous solution. The filter cake is obtained by well-known NaCl salting-out and filtration.

(c) 29.5 parts of 2-methoxy-4-(β-sulfatoethylsulfonyl) aniline and 30 parts of 32% HCl aqueous solution are added to 150 parts of 0° C. water and then the solution is stirred thoroughly, followed by the rapid addition of 7.2 parts of sodium nitrite aqueous solution. Diazotization is carried out for 1.5 hours at 0~5° C., followed by the addition of the filter cake obtained from the above (b) step. The pH value is adjusted slowly to 6~6.5 by sodium bicarbonate. After completion of the reaction, the orange product of the following formula (1) is obtained by salting-out, filtration and dryness.

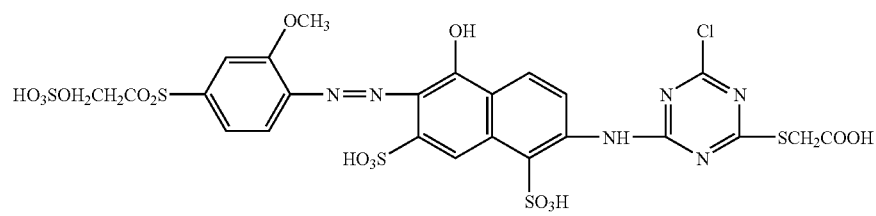

(1)

EXAMPLE 2

(a) 19.45 parts of cyanuric chloride is dispersed in 150 parts of 0° C. water, and then 31.5 parts of 1-naphthol-8-amino -3,6-disulfonic acid powder is added therein. The pH value of the reaction solution is adjusted to 3 by 15% of $Na_2CO_3$ aqueous solution. The temperature of the aqueous solution is raised smoothly to 20° C. and then maintained for 1~2 hours.

(b) 9.7 parts of thioglycolic acid is added to the solution obtained from the above (a) step. At 20° C., the pH value of the reaction solution is adjusted to 7~7.5 by 18 parts of $Na_2CO_3$ powder and maintained for 15 minutes, followed by adjusting the pH value of the reaction solution to 6~6.5 by HCl aqueous solution. The filter cake is obtained by well-known NaCl salting-out and filtration.

(c) 29 parts of 4-(β-sulfatoethylsulfonyl) aniline and 50 parts of 32% HCl aqueous solution are added to 150 parts of 0° C. water and then the solution is stirred thoroughly, followed by the rapid addition of 7.2 parts of sodium nitrite aqueous solution. Diazotization is carried out for 1.5 hours at 0~5° C., followed by the addition of the filter cake obtained from the above (b) step. The pH value is adjusted slowly to 6~6.5 by sodium bicarbonate. After completion of the reaction, the red product of the following formula (2) is obtained by salting-out, filtration and dryness.

the reaction solution is adjusted to 7~7.5 by 18 parts of $Na_2CO_3$ powder and maintained for 15 minutes, followed by adjusting the pH value of the reaction solution to 6~6.5 by HCl aqueous solution. The filter cake is obtained by well-known NaCl salting-out and filtration.

(c) 19.5 parts of the filter cake obtained from the above (b) step and 25 parts of 32% HCl aqueous solution are added to 150 parts of 0° C. water and then the solution is stirred thoroughly, followed by the rapid addition of 3.6 parts of sodium nitrite aqueous solution. Diazotization is carried out for 1.5 hours at 0~5° C., followed by the addition of 16.0 parts of 1-naphthol-8-amino -3,6-disulfonic acid powder. The pH value is adjusted slowly to 3 by 10 parts of sodium bicarbonate. After completion of the reaction, the filter cake is obtained by salting-out and filtration.

(d) 16.55 parts of 1-aminobenzene-4-(β-sulfatoethylsulfonyl)-2-sulfonic acid and 12.6 parts of 32% HCl aqueous solution are added to 150 parts of 0° C. water and then stirred thoroughly, followed by the rapid addition of 3.7 parts of sodium nitrite aqueous solution. Diazotization is carried out for 1~2 hours at 0~5° C. and then the filter cake obtained from

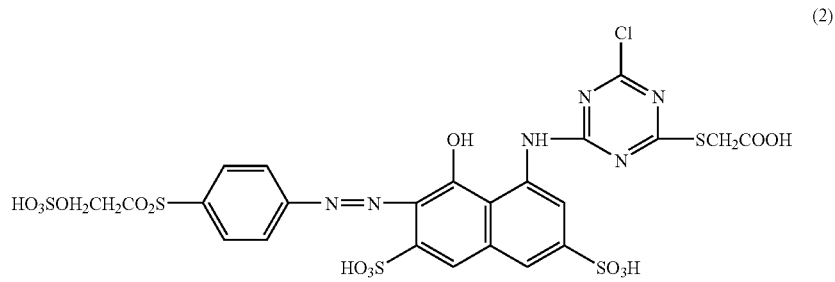

(2)

EXAMPLE 3

(a) 19.45 parts of cyanuric chloride is dispersed in 150 parts of 0° C. water, and then 18.8 parts of 1,3-phenylenediamine-4-sulfonic acid powder is added therein. The pH value of the reaction solution is adjusted to 3 by 15% of $Na_2CO_3$ aqueous solution. The temperature of the aqueous solution is raised smoothly to 20° C. and then maintained for 1~2 hours.

(b) 9.7 parts of thioglycolic acid is added to the solution obtained from the above (a) step. At 20° C., the pH value of the above (c) step is added into the diazonium salt solution. The pH value is adjusted slowly to 5~6 by sodium carbonate. After completion of the reaction, the navy product of the following formula (3) is obtained by salting-out, filtration and dryness.

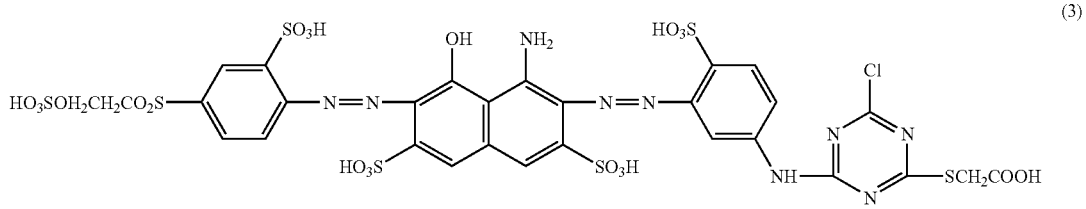

(3)

According to the synthetic methods of Example 1~3, the dyestuffs of the following examples 4~36 are obtained. In the table, the color appearance is the color of the dyestuff dissolved in water.

| Example | Structure of dyestuff | color appearance |
|---|---|---|
| 4 | (4) | Brilliant Yellow |
| 5 | (5) | Yellow |
| 6 | (6) | Yellow |
| 7 | (7) | Yellow |
| 8 | (8) | Yellow |

-continued
| Example | Structure of dyestuff | color appearance |
|---|---|---|
| 9 | 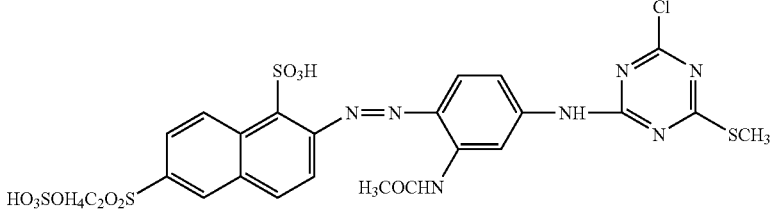 (9) | Yellow |
| 10 | 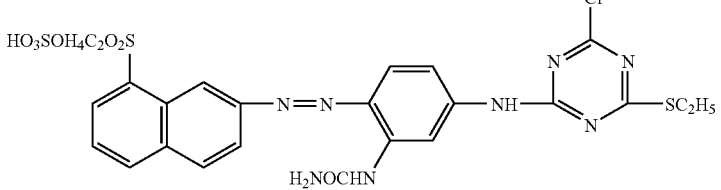 (10) | Yellow |
| 11 | 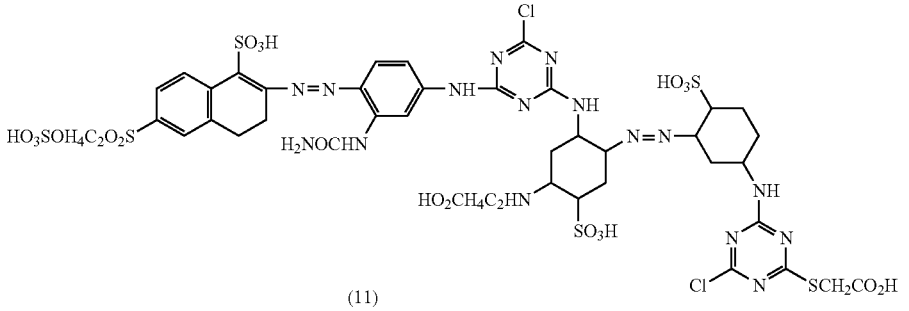 (11) | Yellow |
| 12 | 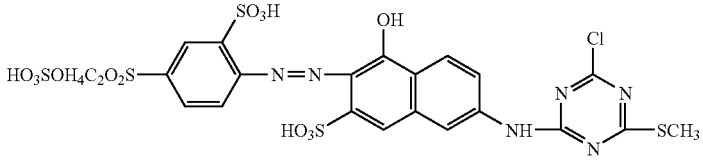 (12) | Orange |
| 13 | 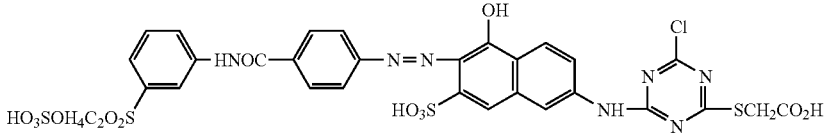 (13) | Orange |
| 14 | 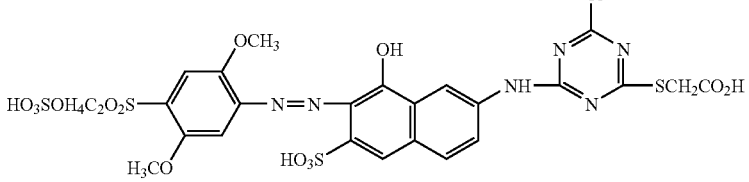 (14) | Orange |

-continued

| Example | Structure of dyestuff | color appearance |
|---|---|---|
| 15 | (15) | Orange |
| 16 | (16) | Orange |
| 17 | (17) | Dull Orange |
| 18 | (18) | Red |
| 19 | (19) | Red |

-continued

| Example | Structure of dyestuff | color appearance |
|---|---|---|
| 20 | (20) | Red |
| 21 | (21) | Red |
| 22 | (22) | Red |
| 23 | (23) | Red |

| Example | Structure of dyestuff | color appearance |
|---|---|---|
| 24 | (24) | Red |
| 25 | (25) | Red |
| 26 | (26) | Red |
| 27 | (27) | Brown |
| 28 | (28) | Scarlet |

| Example | Structure of dyestuff | color appearance |
|---|---|---|
| 29 | (29) | Rubin |
| 30 | (30) | Violet |
| 31 | (31) | Navy |
| 32 | (32) | Navy |
| 33 | (33) | Navy |
| 34 | (34) | Navy |

| Example | Structure of dyestuff | color appearance |
|---|---|---|
| 35 | (structure 35) | Navy |
| 36 | (structure 36) | Green |

EXAMPLE 37

(a) 19.45 parts of cyanuric chloride is dispersed in 150 parts of 0° C. water, and then 18.8 parts of 1,3-phenylenediamine-4-sulfonic acid powder is added therein. The pH value of the reaction solution is adjusted to 3 by 15% of $Na_2CO_3$ aqueous solution. The temperature of the aqueous solution is raised smoothly to 20° C. and then maintained for 1~2 hours for the next step.

(b) 9.7 parts of thioglycolic acid is added to the solution obtained from the above (a) step. At 20° C., the pH value of the reaction solution is adjusted to 7~7.5 by 18 parts of $Na_2CO_3$ powder and maintained for 15 minutes, followed by adjusting the pH value of the reaction solution to 6~6.5 by HCl aqueous solution. The filter cake is obtained by well-known NaCl salting-out and filtration.

(c) 19.5 parts of the filter cake obtained from the above (b) step and 25 parts of 32% HCl aqueous solution are added to 150 parts of 0° C. water and then the solution is stirred thoroughly, followed by the rapid addition of 3.6 parts of sodium nitrite aqueous solution. Diazotization is carried out for 1.5 hours at 0~5° C., followed by the addition of 8.0 parts of 1-naphthol-8-amino-3,6-disulfonic acid powder. The pH value is adjusted slowly to 3 by 10 parts of sodium bicarbonate to accomplish the coupling reaction. After completion of the reaction, the dark blue product of the following formula (37) is obtained by salting-out, filtration and dryness.

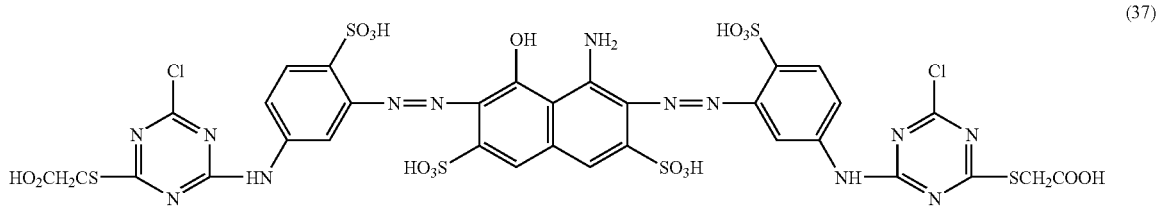

(37)

EXAMPLES 38-46

According to the synthetic method of Example 37, the dyestuffs of the following examples 38~46 are obtained. In the table, the color appearance is the color of the dyestuff dissolved in water.

| Example | Structure of Dyestyff | Color appearance |
|---|---|---|
| 38 | (38) | Orange |
| 39 | (39) | Red |
| 40 | (40) | Red |

-continued

| Example | Structure of Dyestuff | Color appearance |
|---|---|---|
| 41 | (41) | Red |
| 42 | (42) | Scarlet |
| 43 | (43) | Navy |

-continued

| Example | Structure of Dyestyff | Color appearance |
|---|---|---|
| 44 | (44) | Green |
| 45 | (45) | Blue |
| 46 | (46) | Turquoise |

TESTING EXAMPLE 1

0.25 parts of the dyestuff as prepared in example 1 is dissolved in 250 mL of water to obtain a dye liquid. To 40 mL of the dye liquid, in a dyeing bottle, 2 parts of cotton fabric is added, followed by addition of 2.4 parts of Glauber's salt, and finally 2.5 mL of 32% alkali solution. The dyeing bottle is placed in a horizontal shaking bath at 60° C. while maintaining the temperature for 60 minutes. The obtained golden fabric is orderly washed with cold water, boiling water for 10 minutes, boiling non-ionic detergent for 10 minutes, and again with cold water and then dried to obtain an orange dyeing product with good build up and tinctorial yield.

TESTING EXAMPLE 2

100 parts of Urea, 10 parts of m-nitrobenzene sulfonic acid sodium salt, 20 parts of sodium bicarbonate, 55 parts of sodium alginate, and 815 parts of lukewarm water are stirred in a vessel to obtain a completely homogeneous printing paste.

3 parts of the dyestuff prepared in example 2 is sprayed in 100 parts of the above printing paste and stirred to make a homogeneous colored paste. An adequate size piece of twilled cotton fabric is covered with a 100 mesh 45°-twilled printing screen and then painted with the colored paste on the printing screen to give a colored fabric.

This colored fabric is placed in an oven at 65° C. for 5 minutes until dry and then put into a steaming oven using saturated steam of 102~105° C. for 10 minutes.

The obtained rosy fabric is orderly washed with cold water, boiling water for 10 minutes, boiling non-ionic detergent for 10 minutes, again with cold water and then dried to obtain a red fabric with good build up and good tinctorial yield.

TESTING EXAMPLE 3

3 parts of the dyestuff prepared in example 3 is dissolved in 100 mL of water to obtain a 30 parts/l padding liquor. 25 ml of alkali solvent (taking 15 ml/l of NaOH (38° Be') and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained orange fabric is orderly washed with cold water, boiling water for 10 minutes, boiling non-ionic detergent for 10 minutes, again with cold water and then dried to obtain a navy fabric with good build up and good tinctorial yield.

From the foregoing description, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A reactive dyestuff of the following formula (1):

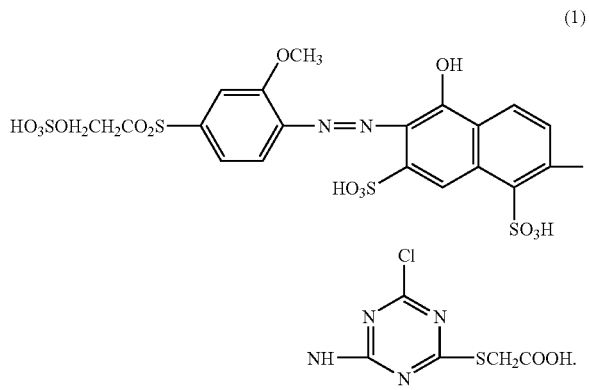

2. A reactive dyestuff of the following formula (2):

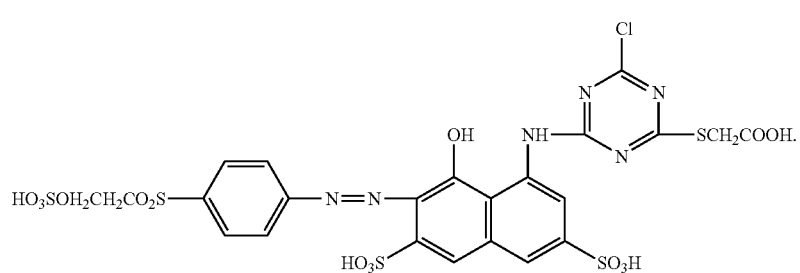

3. A reactive dyestuff of the following formula (3):

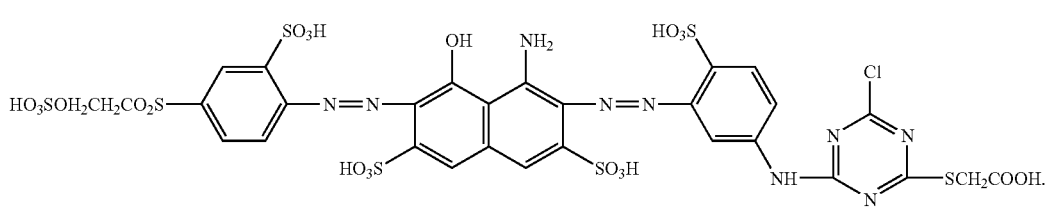

* * * * *